United States Patent [19]

Arnold et al.

[11] Patent Number: 4,493,343

[45] Date of Patent: Jan. 15, 1985

[54] SINGLE LEVER FAUCET ASSEMBLY

[75] Inventors: Don C. Arnold, Buffalo Grove, Ill.; Thomas J. Wilcox, East Troy, Wis.

[73] Assignee: Indiana Brass, Inc., Frankfort, Ind.

[21] Appl. No.: 484,464

[22] Filed: Apr. 13, 1983

[51] Int. Cl.³ .............................................. F16K 11/02
[52] U.S. Cl. ............................... 137/625.17; 137/636.3
[58] Field of Search ............. 137/625.17, 625.4, 636.2, 137/636.3, 636.4

[56] References Cited

U.S. PATENT DOCUMENTS

| 3,202,181 | 8/1965 | West | 137/625.17 |
|---|---|---|---|
| 3,269,412 | 8/1966 | Badke | 137/625.17 |
| 3,459,223 | 8/1969 | Katva | 137/625.17 |
| 3,543,799 | 12/1970 | Hayman | 137/625.17 |
| 3,678,961 | 7/1972 | Grosche | 137/636.2 |
| 3,957,081 | 5/1976 | De Wavrin et al. | 137/625.4 |
| 4,033,370 | 7/1977 | Egli | 137/625.17 |
| 4,328,830 | 5/1982 | Greer | 137/636.4 |
| 4,330,011 | 5/1982 | Moen | 137/625.17 |

Primary Examiner—Martin P. Schwadron
Assistant Examiner—John A. Rivell
Attorney, Agent, or Firm—Woodard, Weikart, Emhardt & Naughton

[57] ABSTRACT

A single lever faucet assembly having a faucet control lever which is reversibly mountable laterally on either side of the faucet spout without having to switch positioning of the hot and cold water supply lines thereto. The faucet assembly includes a valve cartridge which may be easily disconnected from the faucet control lever and removed from the faucet base for replacement. The valve cartridge is arranged and disposed to provide a straight through flow path from the hot and cold water supply lines to the faucet spout which is free of any obstructions, thereby maximizing outlet flow rates. The faucet assembly further includes a means for independently controlling discharge temperature and flow rate by separate-patterned movement of the faucet control lever so as to provide uniform temperature regulation at any flow rate.

12 Claims, 7 Drawing Figures

SINGLE LEVER FAUCET ASSEMBLY

BACKGROUND OF THE INVENTION

The present invention relates to single lever faucet assemblies and, more specifically, to single lever faucet assemblies including a valve cartridge adapted for easy installation and removal therefrom.

Present designs for single lever faucets are generally characterized by a pivoting arrangement which controls the degree of alignment between the valve spool, ball or disc and the valve inlets in order to control flow rate and mixing level from the hot and cold water supplies. U.S. Pat. No. 4,226,260 to Schmidt discloses a single lever faucet which is characteristic of this type. While single lever faucets have enjoyed a considerable degree of popularity, present designs suffer several disadvantages. The control arrangement permits both temperature and flow rate to be controlled by pivotal movement of the control lever in any direction within the free range of operation of the lever. Single lever faucets incorporating this design inherently lack adequate operating definition of the temperature and volume controls. Thus, operation of most present single lever faucets of this type is somewhat confusing and often requires a person to "play" with the faucet control lever in order to determine the proper adjustment of the faucet to attain the temperature and flow rate which is desired.

The ability of the faucet control mechanism to provide uniform movement of temperature regulation at any flow rate is referred to as a square operating pattern. A further disadvantage of many single lever faucet designs resides in their inability to provide uniform movement of temperature regulation at any flow rate. The gimbal-type control mechanism disclosed in U.S. Pat. No. 4,226,260 to Schmidt provides a delta operating pattern which results in variable temperature regulation movement. Thus, for example, whereas the stem of a valve may travel one inch from extreme hot to extreme cold in a full volume setting. only one-fourth inch may be provided for the same regulation when flow is at a trickle. This makes "fine tuning" very difficult, since the travel of one-sixteenth inch would far overshoot the desired selection, resulting in repeated attempts at correction. A square pattern, on the other hand, permits the same degree of travel at trickle settings as it does at full volume. Another advantage of a square pattern activation is the ability to preselect temperature before turning water on. The advantage of this feature can be readily appreciated by anyone who has experienced searching for the desired temperature setting on a shower faucet. Thus, a single lever faucet providing a square operating pattern offers a distinct improvement over other single lever faucet designs which inherently cannot provide a square operating pattern.

Another disadvantage which is present in certain types of single lever faucets involves the design of the flow pattern through the valve mechanism. Thus, it is perceived that many single lever faucet designs require valve arrangements which either segment the flow pattern therethrough, require the flow pattern to execute relatively sharp turns, or present other undesirable flow restrictions. Any obstruction or restriction in the flow pattern increases friction and results in a significant pressure decrease between the faucet inlet and outlet, thus reducing the maximum outlet flow rate attainable at any given inlet pressure.

Yet another disadvantage characteristic of all known single lever faucet designs resides in their lack of reversibility. For example, in plumbing back-to-back conventional faucet installations through a common wall, the supply connections to one of the faucets must be criss-crossed in order to orient the hot and cold water supply connections properly to both faucet installations. However, if the faucet temperature control is able to be reversed in orientation, simple parallel piping connections may be employed. Thus, it would be a distinct advantage to provide a single lever faucet assembly which avoids the disadvantages associated with having to criss-cross the hot and cold water supply lines in situations similar to that described above.

Finally, single lever faucets inherently have a more complicated valve arrangement than double lever faucets. This presents problems principly when replacement of a portion of the valve mechanism becomes necessary for any reason. In order to simplify installation and removal of the valve mechanism for replacement or repair purposes, many single lever faucets now use valve cartridges which are designed for quick and simple attachment and removal from the main faucet assembly. An example of such a cartridge is disclosed in U.S. Pat. No. 4,226,260 to Schmidt, previously mentioned above. One disadvantage of this assembly is that it requires the gimbal-type activating mechanism and control lever stem to be replaced in order to replace the valve mechanism. Since it is highly unlikely that both the valve mechanism and activating mechanism would become defective or worn out at the same time, this arrangement requires unnecessary replacement of working parts and is for this reason a disadvantage.

SUMMARY OF THE INVENTION

A single lever faucet assembly according to one embodiment of the present invention is characterized by a faucet base adapted to receive hot and cold water supply lines, a valve cartridge received within the faucet base, a faucet spout mounted on the faucet base, a faucet control lever, and a linkage means associated with the faucet control lever and the faucet base. The valve cartridge includes a valve body and a valve spool axially rotatable and slidable within the valve body. The valve body defines a cavity, a pair of inlets communicating the cavity with the hot and cold water supply lines and an outlet communicating the cavity with the faucet spout. The valve spool defines a mixing chamber and a first pair of inlets and an outlet, each of the valve spool inlets and outlet communicating the mixing chamber with the exterior of the valve spool. The valve cartridge serves to control the flow rate and temperature of water discharged through the valve body outlet and supplied from the hot and cold water supply lines by selective registry, partial registry or non-registry of the valve spool inlets with the valve body inlets. The linking means serves to provide independent control of axial and rotational movement of the valve spool within the valve body cavity by separate-patterned movements of the faucet control lever in order to effect the desired degree of registry between the valve body inlets and the valve spool inlets. The outlet flow temperature control is fully regulable between the temperatures of the discharge from the hot and cold water supply lines at any flow rate.

It is an object of the present invention to provide an improved single lever faucet assembly.

Related objects and advantages of the present invention is made apparent in the following figures and detailed description.

BRIEF DESCRIPTION OF THE DRAWINGS

FIG. 1A is a fragmentary section view showing portions of the valve spool and end cap of the present invention.

DESCRIPTION OF THE PREFERRED EMBODIMENT

Figure 1:
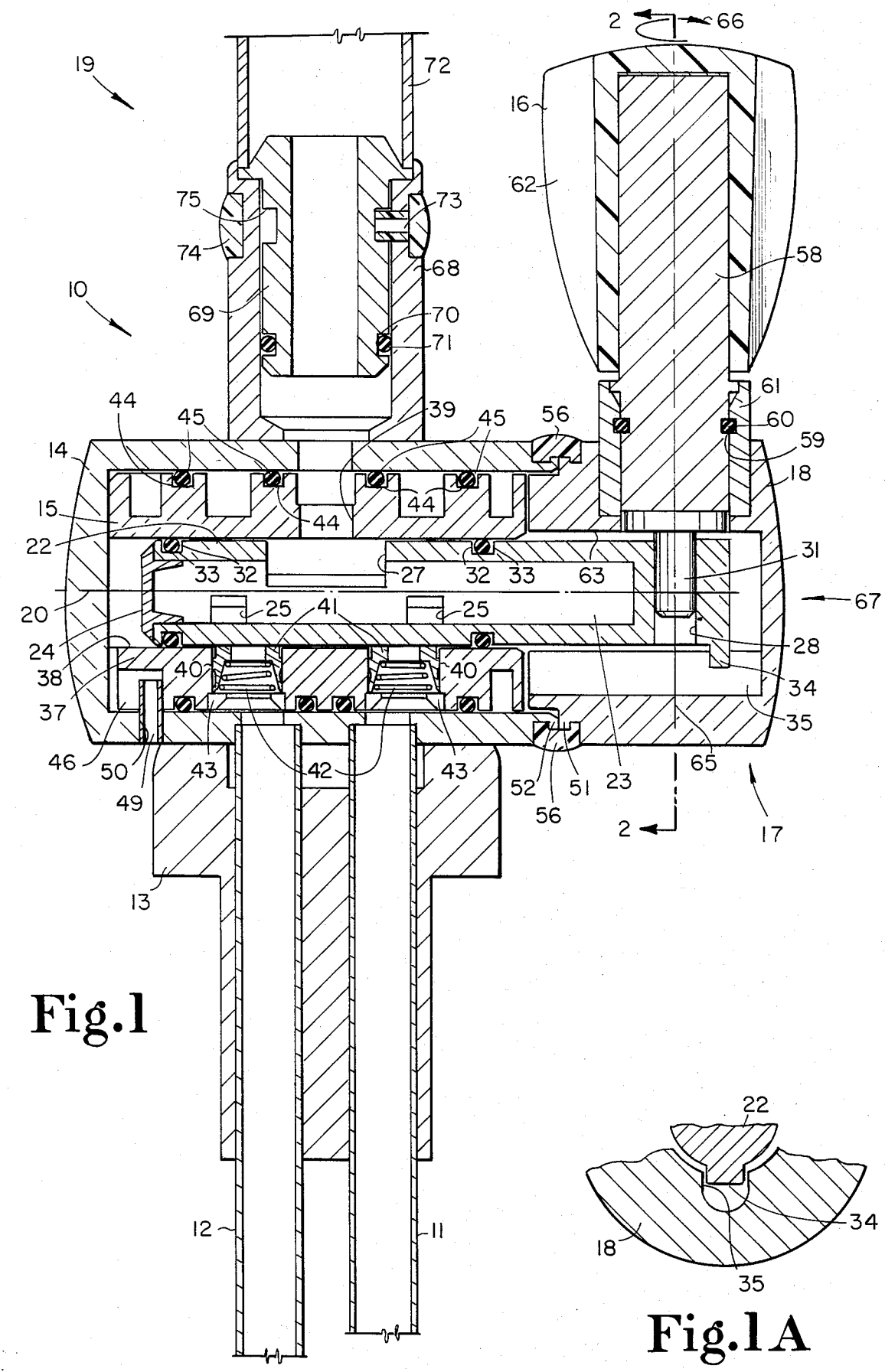
FIG. 1 is a fragmentary front elevation view of the single lever faucet assembly of the present invention in assembled relation and connected to a pair of hot and cold water supply lines, certain sections thereof having been removed in order to show various internal features.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings, the single lever faucet assembly of the present invention is shown generally designated at 10 in FIG. 1 in assembled relation and mounted to hot and cold water supply lines 11 and 12, respectively. Faucet assembly 10 includes a base 13 which is normally mounted on a sink or lavatory with hot and cold water supply lines 11 and 12 received therein. Faucet assembly 10 further includes a faucet body 14 which houses the valving mechanism of the faucet assembly which comprises valve cartridge 15, to be described later herein. At this point it is sufficient to note that valve cartridge 15 controls the discharge flow rate and the discharge temperature from hot and cold water supply lines 11 and 12 and has a unitary design which is adapted for easy installation and removal from faucet assembly 10. Valve cartridge 15 is operably connected to control lever 16 by a linkage arrangement generally designated at 17 which is housed within and includes end cap 18. Faucet assembly 10 also includes a spout 19 which is in flow communication with hot and cold water supply lines 11 and 12 through valve cartridge 15. Only a portion of spout 19 is shown, and it is understood that spout 19 may have any of a number of desirable and well known shapes.

Figure 6:
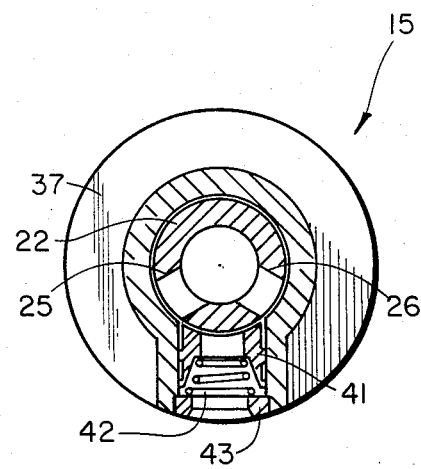

Referring now also to FIGS. 3-6, details of the construction of valve cartridge 15 will now be described in more detail. Valve cartridge 15 is generally comprised of a valve body 37 and a valve spool 22 which is axially slidably and rotatably received therein on axis 20. Valve spool 22 has a generally cylindrical shape and defines an axial bore 23 which is closed at one end by a plug 24 so as to define a mixing chamber for hot and cold water from supply lines 11 and 12. Valve spool 22 includes a first pair of inlets 25 and an outlet 27 which serve to communicate axial bore 23 with the exterior of valve spool 22. As may be seen with reference to FIG. 6, a second pair of inlets 26 is also provided which is angularly spaced from each of the spool inlets 25. While FIG. 6 shows only one of the two spool inlets 26, it is to be understood that a second inlet 26 is similarly positioned behind the other one of spool inlets 25. It is further to be understood that only one pair of inlet pairs 25 and 26 is operable at any one time, the purpose of the second pair of inlets being to provide for reversing of the orientation of control knob 16 with respect to spout 19 in a manner to be described later herein. At the end opposite retaining cap 24, valve spool 22 includes a slot 28 which is sized to journably receive a pin 31 attached to control lever 16. The exterior of valve spool 22 is provided with a pair of annular grooves 32 in which are received O-rings 33 disposed concentrically with axial bore 23. Valve spool 22 also includes a key 34 at the end opposite retaining cap 24 which is shaped to be slidably received within a longitudinal slot 35 in end cap 18 (FIG. 1A).

Valve body 37 is a generally cylindrically shaped member having an axial bore 38 within which is concentrically disposed valve spool 22. Valve body 37 includes an outlet 39 which communicates with outlet 27 of valve spool 22. A pair of inlets 40 is also provided, each of which contains an inlet seal 41, a spring 42 and a retainer 43. Each spring 42 is biased so as to urge the corresponding inlet seal 41 against valve spool 22. Four annular grooves 44 are provided along the exterior of valve body 37 in which are received O-rings 45 to seal the space between valve body 37 and faucet body 14. Valve body 37 also includes an axial slot 46 which is adapted to receive pin 49 which serves to accurately align the inlets and outlet of valve body 37 with the corresponding inlets and outlet of faucet body 14 and retain valve body 37 in the proper position.

Figure 2:
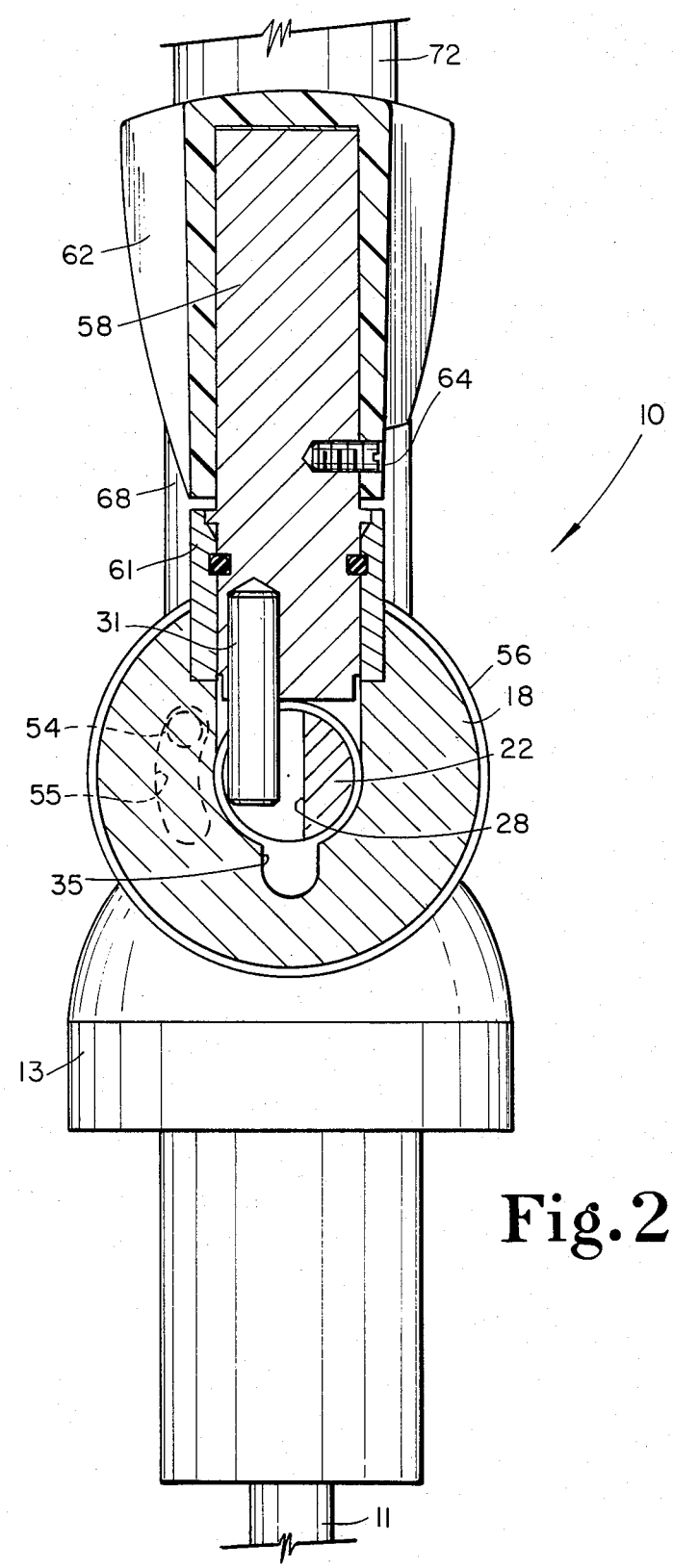
FIG. 2 is a cross section view taken along line 2—2 in FIG. 1.
Figure 3:
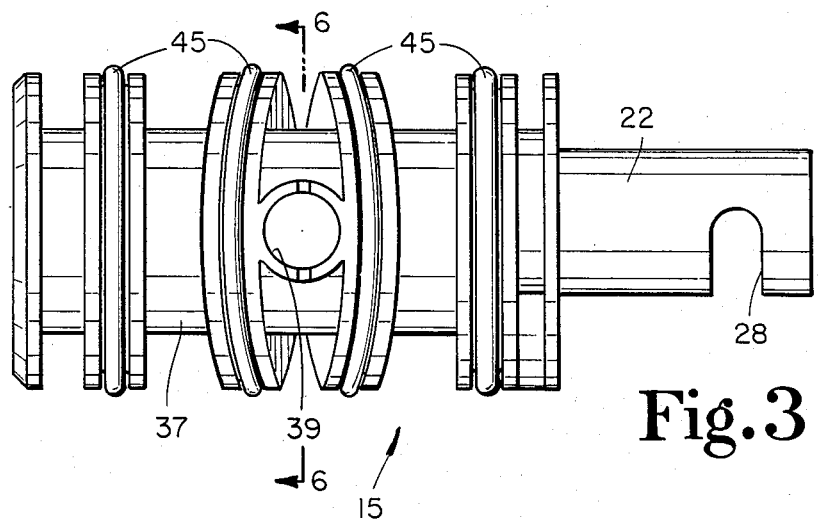
FIG. 3 is a top plan view of the valve cartridge of the present invention.
Figure 4:
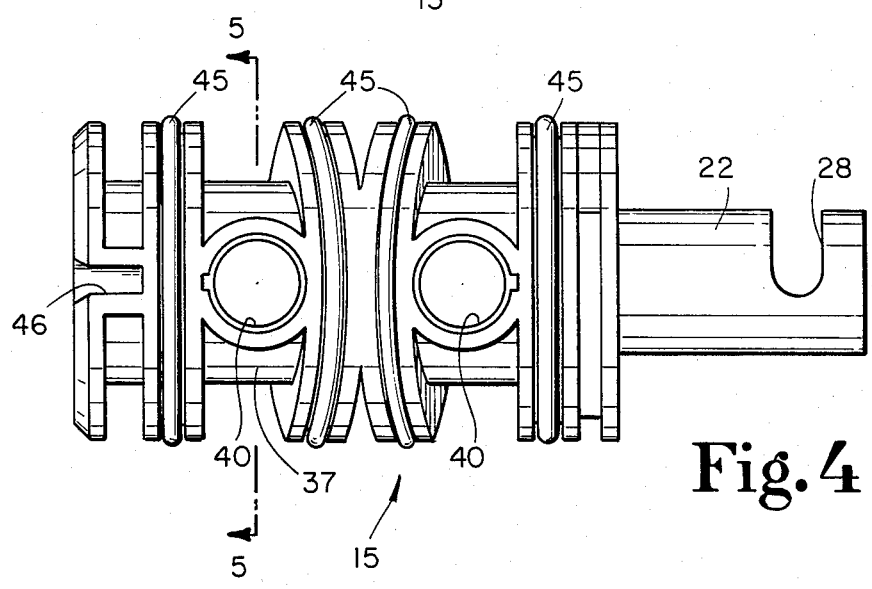
FIG. 4 is a bottom plan view of the valve cartridge of the present invention, rotated 180° relative to FIG. 3.
Figure 5:
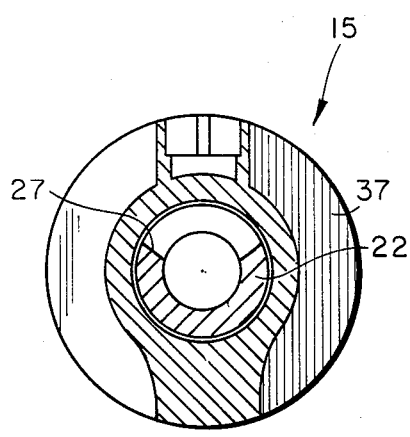
FIGS. 5 and 6 are cross section views taken along lines 5—5 and 6—6, respectively, in FIG. 4 and rotated 90 degrees relative thereto.

Referring now to FIGS. 1 and 2, end cap 18 includes a stop pin 54 adapted to be journably received in an annular guide slot 55 at one end of valve body 37. Ring 56 secures end cap 18 to faucet body 14 in such manner that end cap 18 is able to be rotated on axis 20, it being understood that rotational movement of end cap 18 is restricted by the movement of stop pin 54 within guide slot 55. Control lever 16 includes a stem 58 having an annular groove 59 adapted to receive O-ring 60. Stem 58 is received within guide bushing 61 which is in turn received in a press fit within bore 63 of cap 18. Control lever 16 further includes a conventional style knob 62 which is received over one end of stem 58 and secured thereto by set screw 64. Pin 31 extends from the other end of stem 58 and is eccentrically positioned relative to the central axis 65 of stem 58 which is perpendicular to axis 20.

Spout 19 is seen to include a socket 68 which is fixedly attached at one end to faucet body 14 and at the opposite end receives therein hub 69 having an annular groove 70 receiving O-ring 71. Hub 69 is fixedly attached at one end to spout portion 72 and retained within socket 68 by pin 73 and retaining ring 74. Hub 69 includes an extra bore 75 for receiving pin 73 when it is desired to reverse the orientation of spout 19 for a purpose which will be made apparent later herein.

The operation of single lever faucet assembly 10 may be described as follows. When control lever 16 is rotated on central axis 65 clockwise in the direction of arrow 66, valve spool 22 slides along axis 20 in the direction of arrow 67 under the urging of eccentrically positioned pin 31 as pin 31 moves within slot 28. Thus, pin 31 cooperates with slot 28 to provide a means of indexing valve spool 22 along axis 20. Similarly, it is to be understood that counterclockwise rotation of knob 62 will cause valve spool 22 to move in a direction opposite to arrow 67. Of course, axial movement of valve spool 22 is restricted by faucet body 14 and end cap 18. Thus, rotation of control lever 16 serves to provide a mixing control by the relative alignment, partial alignment, or non-alignment of inlets 25 relative to inlets 40. On the other hand, pivoting control lever 16 about axis 20 causes valve spool 22 to rotate on axis 20 under the urging of end cap 18 along slot 35 against key 34. Pivoting movement of control lever 16 is of course restricted by the movement of spout pin 54 within guide slot 55. At this point it may be appropriate to mention that the rotating of valve spool 22 on axis 20 is in no way restricted by the position of pin 31 within slot 28. Similarly, axial movement of valve spool 22 under the urging of pin 31 against slot 28 is totally independent of the angular orientation of control lever 16. As a result, uniform temperature regulation movement is provided at any flow rate, or in other words, the control mechanism affords a square operating pattern.

It may be appreciated that the design of valve cartridge 15 of the present invention permits relatively easy installation and removal from faucet assembly 10. Thus, valve cartridge 15 is installed within faucet body 14 by simply inserting valve cartridge 15 therein and rotating it until axial slot 46 aligns with bore 50 in faucet body 14 whereupon pin 49 is advanced into axial slot 46 in order to fix the location of valve cartridge 15. End cap 18 is inserted over valve spool 22 such that key 34 is received within longitudinal slot 35 and end cap 18 is advanced until it is partially received within faucet body 14 and shoulder 51 of end cap 18 is urged against an opposing shoulder 52 on faucet body 14. It may be further noted that the design of faucet assembly 10 makes it possible to replace the entire valve mechanism without having to replace any activating parts such as end cap 18 or control lever 16.

It may also be noted that temperature control is accomplished by rotational movement of control lever 16 which is functionally quite different from the pivotal movement of control lever 16 to provide control of the discharge flow rate. The distinctiveness of the control functions is further enhanced by the fact that rotational movement takes place about an axis which is perpendicular to the axis about which control lever 16 pivots. Thus, directions for these controls are much easier to follow, and operability is thereby enhanced.

It may further be appreciated that the design of single lever faucet assembly 10 permits reversing of the orientation between control lever 16 and spout 19, thereby eliminating the need for criss-crossing the hot and cold supply lines 11 and 12 if a parallel connection of lines 11 and 12 to the built-in plumbing would result in an orientation which is reversed relative to the hot and cold directional indicators on knob 62. Thus, while FIG. 1 shows control lever 16 positioned to the right of spout 19, it is possible to position control lever 16 so that it is to the left of spout 19. This is quite simply accomplished by rotating base 13 and faucet body 14 180 degrees thus reversing the orientation of the hot and cold water supply lines 11 and 12 without having to criss-cross them. Retaining ring 56 is then removed from end cap 18 which is then disconnected from faucet body 14. Stop pin 54 is then removed from end cap 18 and relocated into an alternate bore (not shown) in end cap 18. End cap 18 is then reassembled to faucet body 14 in the manner previously described. The orientation of spout 19 is then also reversed by removing spout retaining ring 74 and spout retaining pin 73, rotating spout hub 69 180 degrees and then replacing retaining pin 73 in the extra hole 75 and resecuring retaining ring 74 to spout socket 68.

Another important feature afforded by the novel design of faucet assembly 10 which is readily apparent by reference to FIG. 1 involves the straight through flow path between hot and cold water supply lines 11 and 12 and spout 19. Thus, it is observed that the flow path is not segmented or characterized by significant bending which would present unnecessary restrictions to flow.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A single lever faucet assembly, comprising:
   a faucet base adapted to receive therein hot and cold water supply lines;
   a valve cartridge received within said faucet base, said valve cartridge including
   (a) a valve body, said valve body defining therein a cavity, said valve body further defining a pair of inlets communicating between said valve body cavity and said hot and cold water supply lines and an outlet communicating between said valve body cavity and the exterior of said valve body, and
   (b) a valve spool axially rotatable and slidable within said valve body cavity along a first axis, said valve spool defining therein a mixing chamber, said valve spool further defining a first pair of inlets and an outlet, said valve spool inlets and outlet communicating between said mixing chamber and the exterior of said valve spool,
   said valve cartridge for controlling the flow rate and temperature of water discharged through said valve body outlet and supplied from said hot and cold water supply lines by selective registry, partial registry or non-registry of said valve spool inlets with said valve body inlets;
   a faucet spout mounted on said faucet base in such manner that said faucet spout is in flow communication with said valve body outlet;
   a faucet control lever; and
   a linking means associated with said faucet control lever and said valve spool for linking said faucet control lever and said valve spool in such manner that the temperature and flow rate of water exiting said spout is independently controlled by separate-patterned movement of said faucet control lever, said linking means further for providing said faucet control lever with a square operating pattern of movement, the temperature of water exiting said spout being regulable by uniform movement of said faucet control lever at any set flow rate.

2. The single lever faucet assembly of claim 1 wherein said linkage means includes a cam and follower arrangement for controlling said sliding movement of said valve spool along said first axis by rotating said faucet control lever about a central axis, said axial and rotational controlling means further including an indexing means for independently controlling rotational movement of said valve spool on said first axis by pivotal movement of said faucet control lever about said first axis.

3. The single lever faucet assembly of claim 2 wherein the inlet of said spout and said valve body and valve spool inlets and outlets are arranged and disposed such that the flow path from said valve body inlets to the inlet of said spout lies generally along an axis.

4. The single lever faucet assembly of claim 1 wherein said faucet base includes a base member and a body member mountable on said base member, said base member for receiving said hot and cold water supply lines and said body member receiving said valve cartridge, said valve spool including a second pair of inlets communicating between said mixing chamber and the exterior of said valve body, said body member reversibly mountable on said base member such that a different one of said first and second pairs of valve spool inlets are functional in each mounting orientation of said body member so as to permit said faucet control lever to be positioned laterally on either side of said faucet spout.

5. The single lever faucet assembly of claim 2 wherein said cam of said cam and follower arrangement includes a pin attached to said faucet control lever and eccentrically positioned relative to said central axis of said faucet control lever, said pin journably received within a slot defined by said valve spool.

6. The single lever faucet assembly of claim 2 wherein said faucet control lever is formed about said central axis, said central axis being perpendicular to said first axis.

7. The single lever faucet assembly of claim 3 wherein said axis of flow is perpendicular to said first axis.

8. The single lever faucet assembly of claim 4 wherein said valve spool is cylindrically shaped about said first axis, said valve spool defining a cylindrically shaped mixing chamber having a clear bore between the respective inlets of said first and second pairs of inlets.

9. A cartridge valve for a single lever faucet assembly having a faucet body, a control lever and a spout, said cartridge valve comprising:
a valve body having an axial bore therein, said valve body further having a pair of inlets and an outlet communicating between said axial bore and the exterior of said valve body;
a valve spool defining a chamber therein, said valve spool further defining a first pair of inlets and an outlet, said valve spool inlets and outlet communicating between said chamber and the exterior of said valve spool, said chamber for mixing hot and cold water entering said chamber through said valve spool inlets, said valve spool coaxially rotatable and slidable within said axial bore of said valve body in order to effect any desired degree of alignment between said valve body inlets and said valve spool inlets in such manner that the outlet flow temperature from said valve cartridge is uniformly regulable at any flow rate, said valve spool further including a connecting means for operatively connecting said valve spool to said control lever of said faucet assembly, said valve spool further including a second pair of inlets communicating between said chamber and the exterior of said valve body, said second pair of inlets permitting reversible mounting of said control lever relative to said spout without requiring criss-crossing of hot and cold water supply lines to said faucet assembly, a different one of said first and second pairs of valve spool inlets being functional in each mounting orientation of said faucet body.

10. The cartridge valve of claim 9 wherein said cartridge valve further includes:
a means for sealing the flow paths between said valve body and valve spool inlets and outlet and also between said valve body inlets and outlet and said faucet body.

11. The cartridge valve of claim 9 wherein said valve spool is cylindrically shaped and defines a coaxially cylindrically shaped mixing chamber having a clear bore between the respective inlets of said first and second pairs of inlets.

12. The cartridge valve of claim 9 wherein said valve body and valve spool inlets and outlets are arranged and disposed such that the flow path from said valve body inlets to the outlet of said valve body lies generally along an axis.

* * * * *